(12) United States Patent
Varshney

(10) Patent No.: US 6,433,299 B1
(45) Date of Patent: Aug. 13, 2002

(54) MONOLITHIC MAGNETIC MODULES FOR INTEGRATED PLANAR MAGNETIC CIRCUITRY AND PROCESS FOR MANUFACTURING SAME

(75) Inventor: Usha Varshney, Radford, VA (US)

(73) Assignee: American Research Corporation of Virginia, Radford, VA (US)

( * ) Notice: Subject to any disclaimer, the term of this patent is extended or adjusted under 35 U.S.C. 154(b) by 1125 days.

(21) Appl. No.: 08/589,251

(22) Filed: Jan. 23, 1996

Related U.S. Application Data

(63) Continuation-in-part of application No. 07/757,568, filed on Sep. 11, 1991, now Pat. No. 5,626,789.

(51) Int. Cl.[7] .............................................. B23K 10/00
(52) U.S. Cl. .............................. 219/121.47; 219/121.59
(58) Field of Search ....................... 219/121.47, 121.59, 219/121.67, 121.7, 121.69, 121.85, 121.68; 252/62.62; 336/83, 200, 232

(56) References Cited

U.S. PATENT DOCUMENTS

| | | |
|---|---|---|
| 2,980,618 A | 4/1961 | Guilland et al. |
| 3,020,426 A | 2/1962 | Burgt |
| 3,032,503 A | 5/1962 | Sixtus et al. |
| 3,036,009 A | 5/1962 | Zerbes |
| 3,294,687 A | 12/1966 | Carlson et al. |
| 3,415,751 A | 12/1968 | Hirota et al. |
| 3,509,058 A | 4/1970 | Estival et al. |
| 3,514,405 A | 5/1970 | Rabl et al. |
| 3,533,949 A | 10/1970 | Slick |
| 3,574,116 A | 4/1971 | Sugano et al. |
| 3,609,083 A | 9/1971 | Slick |
| 3,864,824 A | 2/1975 | Watson et al. |
| 4,069,164 A | 1/1978 | Dezawa et al. |
| 4,247,500 A | 1/1981 | Dixon et al. |
| 4,719,148 A | 1/1988 | Stoppels et al. |
| 4,863,625 A | 9/1989 | Roelofsma et al. |
| 5,064,989 A | * 11/1991 | Lemelson ............... 219/121.12 |
| 5,352,656 A | * 10/1994 | Lackey et al. ............... 427/124 |
| 5,430,613 A | * 7/1995 | Hastings et al. ............. 361/760 |
| 5,450,263 A | * 9/1995 | Desaigoudar et al. ....... 360/110 |
| 5,565,837 A | * 10/1996 | Godek et al. ................ 336/232 |

FOREIGN PATENT DOCUMENTS

| | | |
|---|---|---|
| GB | 751623 | 7/1956 |
| GB | 752659 | 7/1956 |
| GB | 803625 | 10/1958 |

OTHER PUBLICATIONS

U.K. Search Report Oct. 21, 1992.
*Maxwell 2D Field Simulation User's Reference*, Ansoft Corp. (Jun. 1994).
Ngo, et al., *Modeling of Losses in a Sandwiched–Winding Matrix Transformer*, IEEE Transactions on Power Electronics, vol. 10, No. 4, p. 427–34 (Jul. 1995).
Ngo, et al, *Modeling of Magnetizing Inductance and Leakage Inductance in a Matrix Transformer*, IEEE Transactions on Power Electronics, vol. 8, No. 2, p. 200–07 (Apr. 1993).
Ngo, et al., *Fabrication Method for a Winding Assembly with a Large Number of Layers*, IEEE Transactions on Power Electronics, vol. 8, No. 1, pp. 55–61 (1993).

* cited by examiner

*Primary Examiner*—Mark Paschall
(74) *Attorney, Agent, or Firm*—James Creighton Wray; Meera P. Narasimhan

(57) ABSTRACT

Magnetic modules and a process for manufacturing magnetic modules are provided wherein magnetic material is deposited into one or more cavities patterned into a non-magnetic substrate die to form a plurality of magnetic cores. The patterned substrate board, which may be a composite of graphite, a composite of alumina or other non-magnetic ceramic, provides a surface for winding windows, inductor air gaps, isolations, and a mounting surface for other system components.

24 Claims, 8 Drawing Sheets

MONOLITHIC MAGNETIC MODULES FOR INTEGRATED PLANAR MAGNETIC CIRCUITRY AND PROCESS FOR MANUFACTURING SAME

This is a continuation-in-part of U.S. patent application Ser. No. 07/757,568, filed Sep. 11, 1991, now U.S. Pat. No. 5,626,789.

FIELD OF THE INVENTION

The present invention relates to magnetic modules and to processes for manufacturing magnetic modules. More particularly, the present invention relates to reduced volume, light weight, low profile, planar magnetic modules for integrated magnetic circuitry and processes for manufacturing such magnetic modules.

BACKGROUND OF THE INVENTION

In the field of electronic circuit design and manufacture, significant effort has been devoted to the miniaturization and planarization of components and circuitry. These efforts have resulted in the continued reduction in the size of consumer, commercial and military electronic and power electronic systems.

One area in which these efforts have been frustrated is in the design of circuits utilizing magnetic components. Traditionally, magnetic components, such as inductors and transformers, have been built as discrete devices for incorporation onto printed circuits boards. These magnetic components are comparatively large, near cube shaped, devices which do not easily conform to the printed circuit layout. The use of these devices has resulted in a lowering of volumetric packaging efficiency and has set limits on the efforts at miniaturization.

The use of discrete magnetic components has also resulted in a reduction of the overall cost efficiency of integrated circuit manufacture. Typically, the discrete magnetic components are fabricated by separate manufacturers resulting in a duplication of design and manufacturing resources and thus limiting cost effectiveness.

A need, therefore, currently exists for a process for manufacturing planar, low profile, highly efficient integrated magnetic components which are compatible with integrated circuits. Particularly, recent developments in very high speed integrated circuits (VHSIC) have led to a requirement for reduced volume, high efficiency, high power density, low profile, low voltage, reliable electronic power converters operating at frequencies in excess of 1 Megahertz. At present, the best available commercial low voltage power converter volume exceeds that occupied by all of the electronic components in VHSIC circuitry.

Current techniques for fabricating ferrite core shapes for magnetic components require component core machining which is a cumbersome process that degrades the properties of the magnetic cores and wastes material. A need, therefore, also exists for a process that is capable of forming various magnetic core shapes without the need for component core machining.

SUMMARY OF THE INVENTION

The present invention satisfies, to a great extent, the need for planar, low profile, highly efficient integrated magnetic components which are compatible with integrated circuitry. This result is achieved by providing a magnetic module having a magnetic core plasma sprayed onto a substrate board.

The magnetic core may be plasma sprayed into a cavity etched in a substrate die. The plasma sprayed magnetic core may be low or high permeability, ultra low loss substituted nickel zinc cobalt (NiZnCo) or manganese zinc cobalt (MnZnCo) ferrites. These magnetic cores are deposited onto the patterned regions of the non-magnetic module and the other regions serve as winding windows, inductor air gaps, isolations or as a mounting substrate for other system components.

In another aspect of the present invention a magnetic module is provided having a plurality of magnetic cores plasma sprayed into cavities patterned in a non-magnetic substrate die. The substrate die can be patterned using laser ablation, ion milling or mechanical machining. The substrate die may be a composite of graphite, alumina or other similar non-magnetic material.

In its process aspects, the present invention is achieved by a process for manufacturing magnetic modules wherein magnetic material is plasma sprayed onto a substrate board to form a magnetic core. The magnetic material may be plasma sprayed into a cavity patterned into the substrate die.

In another aspect of the present invention a process for manufacturing magnetic modules is provided wherein magnetic material is plasma sprayed into a plurality of cavities patterned into a substrate die to form a plurality of magnetic cores. The magnetic material may be substituted nickel zinc cobalt ferrites or substituted manganese zinc cobalt ferrites. The process may also include patterning the substrate board, which may be a composite of graphite, a composite of alumina or other non-magnetic ceramic, using ion milling, laser ablation or mechanical machining.

It is an object of the present invention to reduce the overall manufacturing cost, size and weight of electronic or power electronic systems by fabricating all the magnetic components of a power converter on a single monolithic plate using a single fabrication process of plasma spraying.

It is a further object of the present invention to provide magnetic modules having highly efficient, high power density magnetic components which have reduced volume and low profile.

It is yet another object of the present invention to provide a process for manufacturing magnetic modules having highly efficient, high power density magnetic components which have reduced volume and low profile.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF PREFERRED EMBODIMENTS

Figure 1:
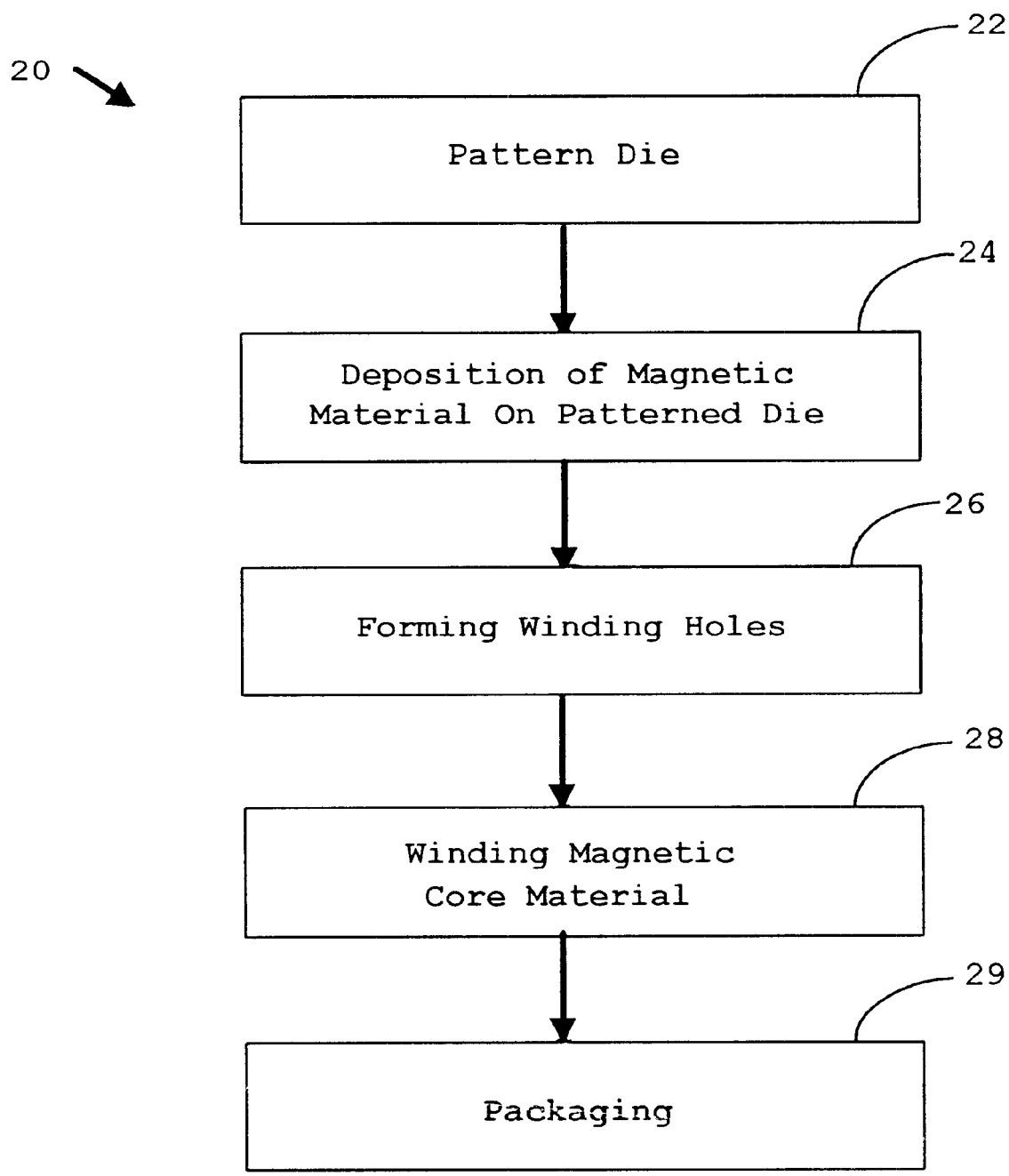
FIG. 1 is a flow chart depicting a process for manufacturing magnetic modules in accordance with a preferred embodiment of the present invention.

Referring now to the figures, wherein like reference numerals indicate like elements, in FIG. 1, there is shown a flow chart of the process for manufacturing a magnetic module, generally designated by reference numeral 20, in accordance with a preferred embodiment of the present invention. The process includes the steps of patterning a die 22, depositing magnetic core material on the patterned die 24, forming winding holes 26, winding the magnetic core material 28 and packaging the magnetic module 29. Each of the steps in this preferred embodiment will be set forth and described in more detail below.

Cavities, in the shape of one or more magnetic cores to be fabricated, are first formed in a die by patterning the die. In the embodiment described herein, laser ablation, which is suited to implementation using computer aided design/computer aided manufacturing (CAD/CAM) techniques is used to fabricate patterned cavities in the die. Although laser ablation is preferred, other cavity patterning techniques such as ion milling, or mechanical machining would also provide suitable patterning of the die and it is intended that the present invention include such techniques.

The die may be any non-magnetic material that is suitable for tooling to create cavity areas and winding holes and which is also suitable for receiving magnetic material to be applied using plasma spraying. Preferably, the die is an alumina or graphite based substrate.

Once the die is patterned 22 magnetic material is deposited 24 into the cavities, formed within the die, using plasma spraying. Following the plasma spraying operation the non-magnetic die will serve as the magnetic module with the deposited magnetic material forming magnetic cores planar with the surface of the substrate board. Although plasma spraying is preferred, the step of depositing the magnetic material may also be accomplished using such techniques as spin-on pyrolysis or any wet chemical or physical vapor techniques, including; metal organic chemical vapor deposition (MOCVD) techniques, pulsed laser deposition, electron beam deposition, beam deposition, or the like.

The module now contains the unit permeability non-magnetic mounting substrate and the high and low permeability low loss magnetic material which serves as the cores for the magnetic components. The substrate board operates not only as a mounting surface for the magnetic cores but also provides a surface for winding windows, inductor air gaps, isolations, and a mounting substrate for other system components.

The net shape ferrite thick film cores are fabricated using a plasma spraying technique under atmospheric as well as low pressure conditions using a METCO plasma flame spray system having a 9 MB gun operating with a METCO type 7 MC-11 flame spray control unit in conjunction with an 8 MR—230 model 792 power supply with a maximum plasma power level of 80 kW.

Following plasma deposition of the magnetic core material 24, the magnetic core material may be densified using hot isostatic pressing. Hot isostatic pressing brings the cores to nearly full density, reduces porosity, increases permeability and reduces power loss density.

Winding holes are then formed in the substrate board 26 by drilling through holes using mechanical tooling or chemical or physical vapor drilling techniques. It should be appreciated that the ordering of the step of forming the winding holes is not critical to the invention and may be performed at other times in the process.

The next step in manufacturing the magnetic module involves applying the core windings 28 in accordance with the desired operational parameters of the magnetic devices. The windings may be provided by any number of plating techniques including photolithography, electro-plating, electro-less plating, chemical vapor polymeric deposition or screen printing or may be applied using flat copper matrix winding, flexible circuit winding or embedded copper thick film winding. It should be appreciated that any winding technique, including the above-named processes, by which winding of the cores is provided may be used in practicing the process of the present invention.

Figure 2:
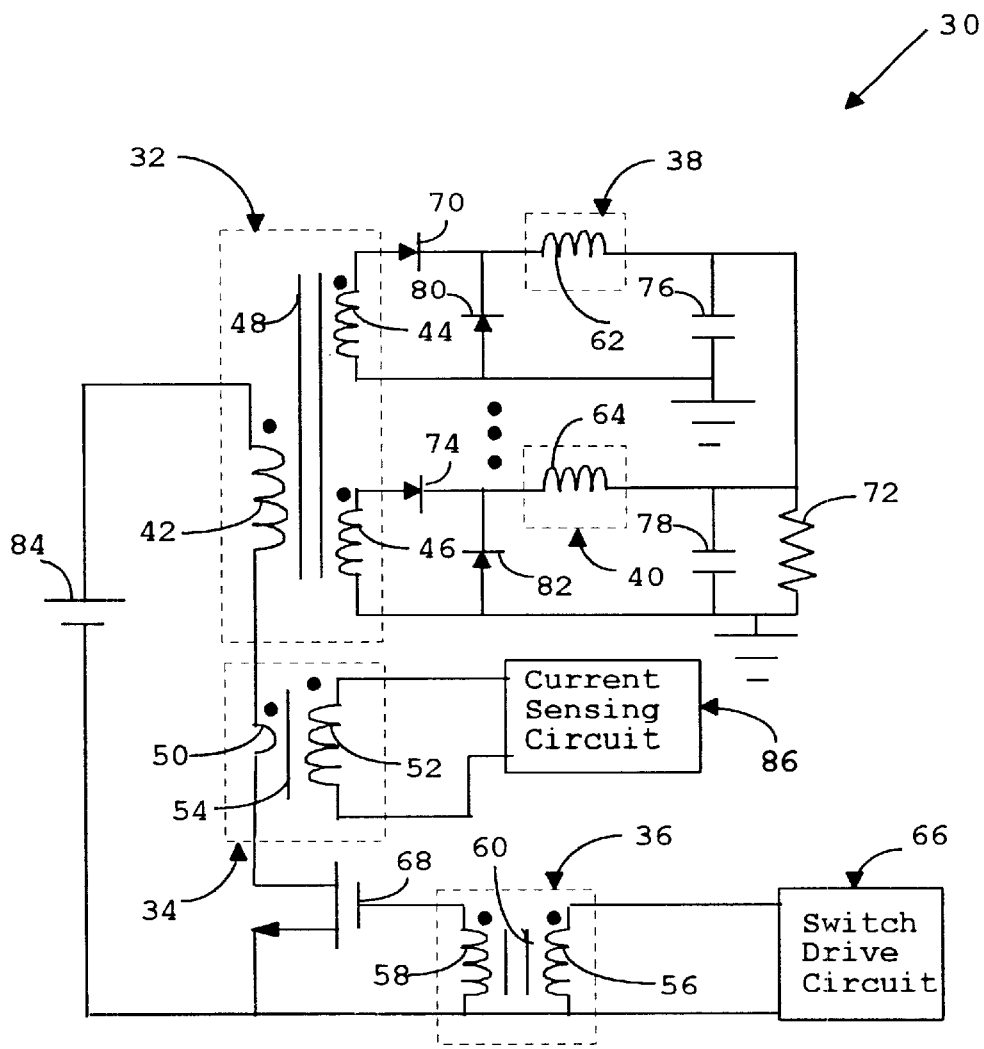
FIG. 2 is a schematic diagram illustrating a power converter circuit to be fabricated in accordance with the process of FIG. 1.

By way of example, the fabrication of a magnetic module in accordance with the above described process will now be described. The magnetic module to be fabricated will implement a flyback dc-to-dc forward power converter circuit, generally designated by reference numeral 30 in FIG. 2. The specifications for the magnetic module are provided in tables 1 through 8 below.

TABLE 1

Plasma Spray Parameters for Depositing Crack-free Ferrite Thick Film Geometries.

| Parameter | Unit | Low Permeability | High Permeability |
| --- | --- | --- | --- |
| Powder Type | | M3 | H |
| Initial Permeability, $\mu_i$ | | 20 | 850 |
| Secondary Gas Flow Rate (Hydrogen) | l/min | 2.4 | 8 |
| Primary Gas Flow Rate (Argon) | l/min | 23.6 | 23.6 |

TABLE 1-continued

Plasma Spray Parameters for Depositing Crack-free Ferrite Thick Film Geometries.

| Parameter | Unit | Low Permeability | High Permeability |
|---|---|---|---|
| Carrier Gas Flow Rate (Nitrogen) | 1/min | 14.2 | 14.2 |
| Powder Feed Rate | kg/hr | 2 | 3 |
| Plasma Power | kw | 27 | 20 |
| Spray Distance | cm | 7.5 | 15 |
| Pressure | Torr | 760 | 760 |

TABLE 2

Magnetic Material Requirements for Magnetic Components of 100 W, 1 MHz DC-DC Power Converter. (Thickness of the module is 2.5 mm).

| Component | Relative Permeability | Flux Density (Gauss) | Core Loss Density (mW/cm$^3$) |
|---|---|---|---|
| Power Transformer | 1500 | 215 | 100 |
| Gate-drive Transformer | 300 | 680 | 250 |
| Current-sense Transformer | 300 | 170 | 10 |
| Inductor | 85 | 310 | 250 |
|  |  | 1500 (peak) |  |

TABLE 3

100 W, 1 MHz DC-DC Forward Power Converter Specification.

| Parameter | Value |
|---|---|
| Input voltage | 50 V |
| Output | 5 V @ 20 A |
| Switching frequency | 1 MHz |
| Converter efficiency | 85% |
| Dimensions | 51 mm × 51 mm × 5 mm (2.0 in × 2.0 in × 0.2 in) |

TABLE 4

Transformer Design Specifications.

| Parameter | Value |
|---|---|
| Output power | 112 W |
| Total loss | 1.4 W |
| Winding loss | 1.0 W |
| Core loss | 0.4 W |
| Turns ratio | 32:8:8:8:8 |
| Number of cells | 2 |
| Number of holes per row | 16 |
| Magnetizing inductance | 260 $\mu$H (263 $\mu$H) |
| Relative permeability | 1500 (assumed) |
| Core-loss density | 100 mW/cm3 (assumed) |
| Average flux density | 215 Gauss |
| Winding thickness | 0.071 mm (0.0028 in) |
| Dimensions | 30 mm × 24 mm × 2.5 mm (1.2 in × 0.93 in × 0.1 in) |

TABLE 5

Gate-drive and Current-sense Transformer Design Specifications.

| Parameter | Gate-drive Transformer Value | Current-sense Transformer Value |
|---|---|---|
| Bipolar volt-seconds | 12 $\mu$Vs | 3 $\mu$Vs |
| Turns ratio | 10:10 | 1:10 |
| Magnetizing inductance | 99 $\mu$H | 99 $\mu$H |
| Relative permeability | 3000 (assumed) | 3000 (assumed) |
| Core loss | 100 mW | 5 mW |
| Core-loss density | 250 mW/cm$^3$ (assumed) | 10 mW/cm$^3$ (assumed) |
| Average flux density | 680 Gauss | 170 Gauss |
| DC resistance of primary winding | 71 m$\Omega$ | 1.1 m$\Omega$ |
| Winding thickness | 0.071 mm (0.0028 in) | 0.071 mm (0.0028 in) |
| Dimensions | 20 mm × 7.6 mm × 2.5 mm (0.8 in. × 0.3 in × 0.1 in) | 20 mm × 7.6 mm × 2.5 mm (0.8 in. × 0.3 in × 0.1 in) |

TABLE 6

Semiconductor Component Specifications.

| Components | Loss | Part Number | Specifications | Manufacturer |
|---|---|---|---|---|
| MOSFET - |  | MTP10N10E | 100 V, 10 A, 0.25 $\Omega$, | Motorola |
| conduction | 3 W |  | $C_{oss}$ = 300 pF |  |
| switching | 1.5 W |  |  |  |
| Diodes | 8 W | 15CTQ035 | 35 V, 15 A, VF = 0.4 V @ 5 A | International Rectifier |
| Capacitors |  | SR505E475ZAA | 4.7 $\mu$F, 50 V | AVX |

TABLE 7

Inductor Design Specification.

| Parameter | Value |
|---|---|
| Inductance | 300 nH |
| DC current | 20 A |
| Current ripple | 10 A (pk-pk) |
| Volt-seconds | 3 $\mu$Vs |
| Air gap length | 2 × 0.64 mm |
| Number of holes/row | 12 |
| Number of turns | 3:3:3:3 |
| DC resistance/ac resistance | 1.4 m$\Omega$ |
| Relative permeability | 85 (assumed) |
| Total loss | 0.8 W |
| Winding loss | 0.6 W |
| Core loss | 0.2 W (assumed) |
| Core-loss density | 250 mW/cm$^3$ (assumed) |
| Peak flux density | 1500 Gauss |
| Average flux density | 310 Gauss |
| Winding thickness | 0.071 mm (0.0028 in) |
| Dimensions | 28 mm × 14 mm × 2.5 mm (1.1 in × 0.55 in × 0.1 in) |

TABLE 8

Major Losses and Convertor Efficiency.

| Component | Loss |
|---|---|
| Diode | 8.0 W |
| MOSFET | 4.5 W |
| Transformer | 1.8 W |
| Inductor | 0.8 W |
| Miscellaneous losses | 2.5 W |
| Total major losses | 17.6 W |
| Efficiency, based on 18 W total loss | 85% |

The specifications provided in Tables 1 through 8 above can be derived using the procedures and finite element simulation provided in the following articles: "Maxwell 2D Field Simulation User's Reference," Ansoft Corporation, June (1994); Ngo, et al., "Modeling of Losses in a Sandwiched-Winding Matrix Transformer," IEEE Transactions on Power Electronics, Vol. 10, No. 4, pp. 427–434, July (1995); Ngo, et al., "Modeling of Magnetizing Inductance and Leakage Inductance in a Matrix Transformer," IEEE Transactions on Power Electronics, Vol. 8, No. 2, pp. 200–207, April (1993); and Ngo, et al. "Fabrication Method for a Winding Assembly with a Large, Number of Layers," IEEE Transactions on Power Electronics, Vol. 8(1) pp. 55–61 (1993); the disclosure of which is incorporated herein by reference.

As depicted, the forward converter circuit 30, contains a number of magnetic components including a power transformer 32, a current sense transformer 34, a gate-drive transformer 36 and a first and fourth filter is inductor 38, 40, respectively.

The power transformer 32 is composed of a primary winding 42, secondary windings 44, 46 and a magnetic core 48. Both the primary winding 42 and the secondary windings 44, 46 are wound around the core 48 such that when current is supplied through the primary winding 42 a magnetic field is generated in the transformer core 48 resulting in a current flow in the secondary windings 44, 46.

In the power converter circuit to be described, four secondary windings are provided. For clarity, however, only the first and fourth secondary windings 44, 46 of the power transformer 32 have been shown in FIG. 2. Each of the four secondary windings, and the associated circuitry, are identical.

The current sense transformer 34 is composed of a primary winding 50, a secondary winding 52 and a magnetic core 54. Both the primary 50 and secondary winding 52 are wound around the magnetic core 54. When current is provided through the primary winding 50 a magnetic field is generated in the transformer core 54 resulting in a current flow through the secondary winding 52.

The gate drive transformer 36 is composed of a primary winding 56, a secondary winding 58 and a magnetic core 60. Both the primary and secondary winding 56, 58 are wound around the magnetic core 60 such that when current is passed through the primary winding 56 a magnetic field is generated in the transformer core 60 resulting in a voltage potential across the secondary winding 58.

The inductors 38, 40 are composed of a single winding 62, 64 around a magnetic core. Inductors of this type are useful in filtering out transient ac voltages.

In operation, a switch drive circuit, generally designated by reference numeral 66, provides an input signal to the gate-drive transformer 36. This input signal generates a current through the primary winding 56 of the transformers. A magnetic field is generated in the transformer core 60 resulting in a voltage potential across the secondary winding 58 sufficient to bias the switching transistor 68. A closed circuit across the transistor 68 results.

With the switching transistor 68 biased on, current flows through the primary winding 42 of the power transformer 32. Magnetic energy, generated as current flows through the primary winding 42, causes a current flow through the secondary windings 44, 46.

The current flow through the secondary winding 44 passes through rectifying diode 70, through the first filter inductor 38 to the load 72. The current flow through secondary winding 46 passes through rectifying diode 74, through the fourth filter inductor 40 to the load 72. Similarly, current flow through the second and third secondary windings, not shown, also provide current flow to the load 72.

The filter inductors 38, 40 suppress rapid current changes and thus are used to filter out transient ac voltages. Alternatively, capacitors 76, 78 suppress rapid voltage changes and thus are used to filter out transient dc voltages. Rectifying diodes 70, 74, 80, 82 ensure the flow of current in one direction through the filter inductors 38, 40 and thus in one direction through the load 72.

With the switching transistor 68 on, current is also provided by battery 84 through the primary winding 50 of the current sense transformer 34. The current through the primary winding 50 generates a magnetic field in the transformer core which results in a current flow through the secondary winding 52. The secondary winding 52 is connected to a circuit, generally designated with reference numeral 86, for determining the current through the primary winding of the power transformer 42.

The first step in fabricating a magnetic module implementing the forward converter 30 is to pattern a die to create cavities in the substrate board. Shown in FIG. 3, generally designated by reference numeral 88, is the patterned die for the forward converter.

The patterned die 88 consists of a non-magnetic substrate plate 90 having a cavity 92 for the power transformer 32, a cavity 94 for the first inductor 38 and second inductor, not shown, a cavity 96 for the third inductor, not shown, and the fourth inductor 40, a cavity 98 for the current sense transformer 34 and a cavity 100 for the gate-drive transformer 36. These cavities are formed in the substrate plate using laser ablation, ion milling or mechanical machining.

The patterning of the die in the present embodiment of the invention may be accomplished on graphite and alumina-based substrates using a laser wavelength of 10.6 mm, power densities of $3.4 \times 10^6 \text{W/cm}^2$ and $3.0 \times 10^4 \text{W/cm}^2$ and substrate translation rate of 25 cm/min at atmospheric pressure.

Contained within the power transformer cavity 92 are two winding windows 102, 104 formed by substrate material left intact during the etching or ablation process. The first winding window 102 contains a first elongated end piece 106 joined to a second elongated end piece 108 connected by a narrow central piece 110. The "H" shaped winding window 102 is used to avoid crowing at the ends of the transformer. The second winding window 104 is also formed in this "H" shape.

The cavity 94 for the first and second filter inductors and the cavity 96 for the third and fourth filter inductors are divided by an air gap 112. The air gap provides isolation between the filter inductor cores 94, 96. Provided within each of the filter inductor cores 94, 96 are winding windows 114, 116. Each of the winding windows 114, 116 and air gap 112 are formed by substrate material left intact during the etching, milling or ablation process.

The current sense transformer cavity 98, contains a single "H" shaped winding window 118. The winding window 118 is formed by substrate material left intact during the etching, milling or ablation process. The "H" shape is chosen to avoid noises due to flux overlap at the corners.

The gate-drive transformer cavity 100, also contains a single "H" shaped winding window 120. The winding window 120 is formed by substrate material left intact during the etching, milling or ablation process.

Figure 3:
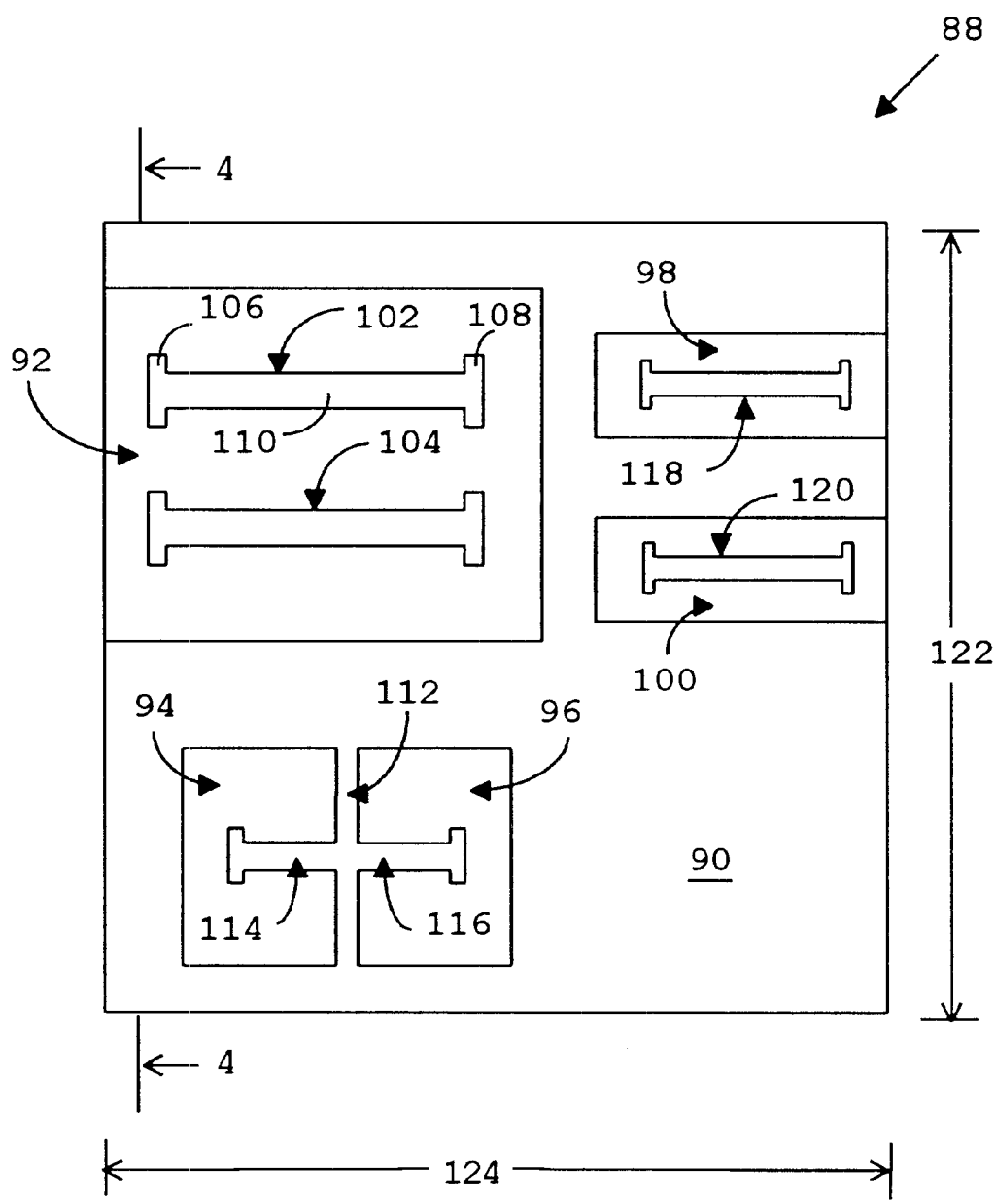
FIG. 3 is a plan view of a substrate die having patterned cavities.

As depicted in FIG. 3 the substrate board 90 has a length 122 and width 124. In the present implementation the length 122 and width 124 of the substrate board are both fifty-one millimeters (51.0 mm×51.0 mm), i.e. two inches (2"×2").

Figure 4:
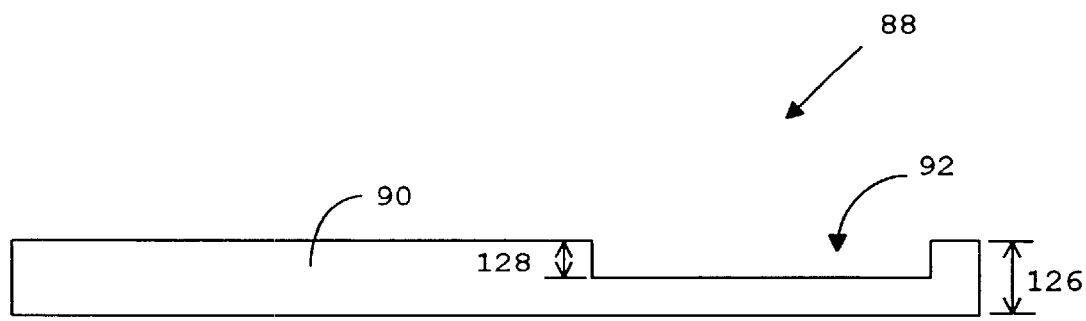
FIG. 4 is a sectional view of the substrate die of FIG. 3, taken along the lines IV—IV.

Depicted in FIG. 4 is a cross sectional view of the die 88, taken across lines IV—IV of FIG. 3. As shown, the power transformer cavity 92 is formed by patterning the substrate 90 having a depth 128 selected to provide optimum performance characteristics of the magnetic core. In the embodiment of the power converter it has been determined that a cavity depth 128 of one millimeter (1 mm) to two and a half millimeters (2.5 mm), i.e. 0.04 inches (0.04") to 0.01 inches (0.1"), provides the optimum performance characteristics. The substrate board thickness 126, is two and a half millimeters (2.5 mm), i.e. 0.1 inches (0.01").

Following the patterning process the patterned die 88, is plasma sprayed with a magnetic core material. In the plasma spray process a stream of ferrite powder is suspended in a carrier gas such as Nitrogen and is introduced into a plasma jet, melted and accelerate toward the die where the particles are rapidly solidified and a thick film coating is formed.

The plasma jet is formed as a plasma gas, typically hydrogen and argon, which is passed through a high intensity electric arc between a nozzle-shaped, water-cooled anode and a stick-type cathode. As the ferrite particles are introduced into the plasma arc jet, they are heated and accelerated by the jet. The electrical input to the plasma apparatus may result in an increase in the bulk total enthalpy, $h_g$, of the plasma gas or be rejected to the cooling water. The efficiency $\phi$, of the plasma spray process is related to the electrical power input and the total gas enthalpy output by, $$P_g = \phi VI = M_g h_g$$

where $P_g$ is the power in Watts of the arc jet plasma gas, V is the arc voltage in volts, I is the arc current in Amperes, $M_g$ is the plasma gas mass flow rate in kilograms per second (kg/s) and $h_g$ is the bulk total enthalpy of the plasma gas in Joules per kilogram (J/kg).

Figure 5:
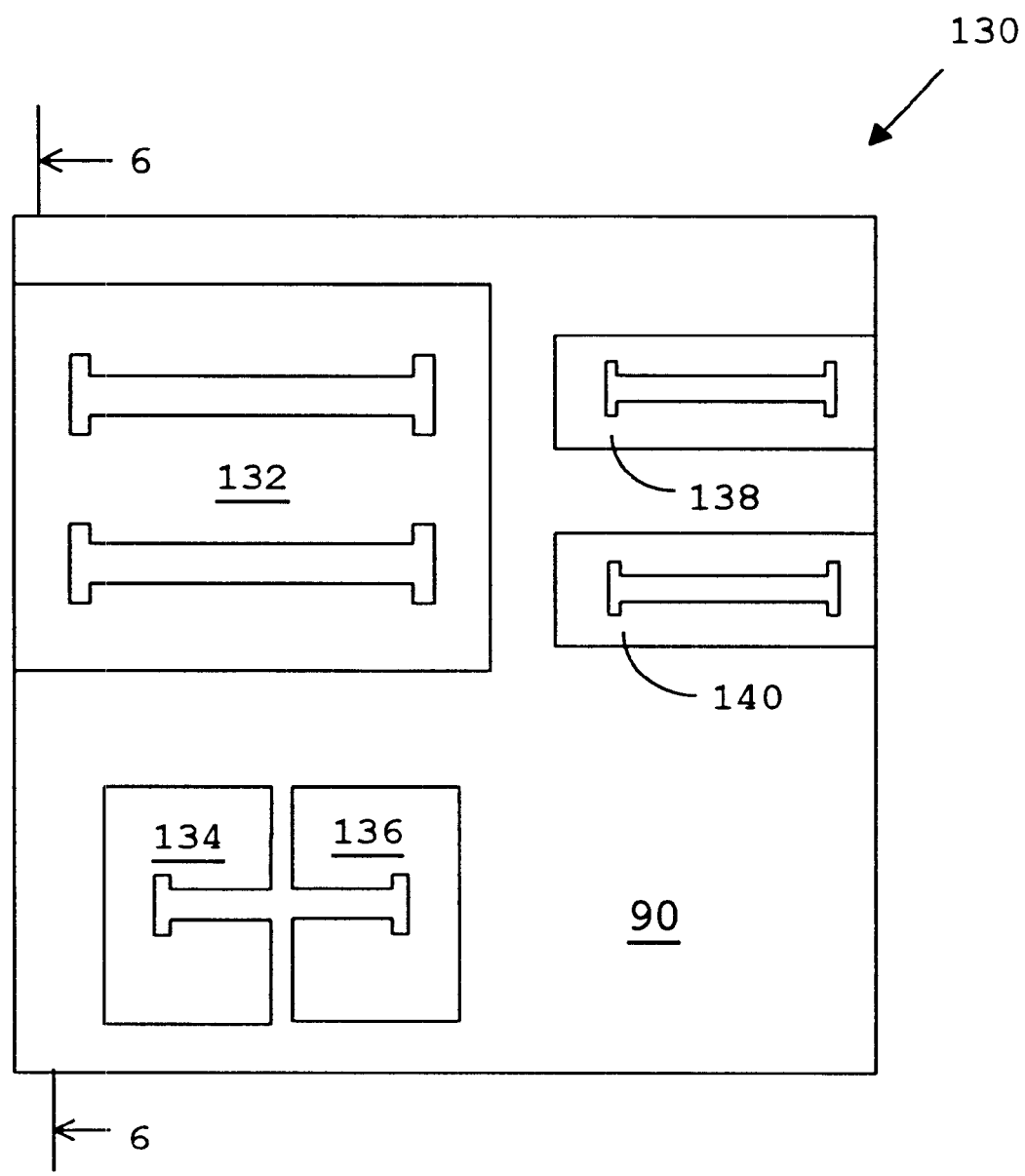
FIG. 5 is a plan view of the substrate die of FIG. 3, having magnetic cores formed within the cavities patterned in the substrate die.

The plasma sprayed die, generally designated by reference numeral 130, is shown in FIG. 5. The magnetic material deposited on the substrate board 90 forms the power transformer core 132, filter inductor cores 134, 136, current sense transformer core 138 and gate drive transformer core 140.

The magnetic material utilized in the process of the present embodiment is preferably a substituted Nickel Zinc Cobalt or Manganese Zinc Cobalt ferrite powders of the type described in co-pending U.S. patent application Ser. No. 07/757,568, the disclosure of which is incorporated herein by reference.

Particularly, the magnetic material comprises a compound that essentially satisfies the formula $RFe_2O_4$ where R is $Ni_{1-x-y-z}Zn_xCo_yP_z$ where P is selected from the group consisting of Cr, Mn and Li. The core material is further characterized in that where R is $Ni_{1-x-y-z}Zn_xCo_yCr_z$, x is in the range of from about 9.01 to about 0.7, y is in the range of from about 0.001 to about 0.25 and z is in the range of from about 0.01 to about 0.40, preferably about 0.1 to about 0.2; where R is $Ni_{1-x-y-z}Zn_xCo_yMn_z$, x is in the range of from about 0.01 to about 0.7, y is in the range of from about 0.001 to about 0.25 and z is in the range of from about 0 to about 0.75; and where R is $Ni_{1-x-y-z}Zn_xCo_yLi_z$, x is in the range of from about 0.01 to about 0.7, y is in the range of from about 0.01 to about 0.25 and z is in the range of from about 0.01 to about 0.30.

According to a particularly preferred embodiment, R is $Ni_{1-x-y-z}Zn_xCo_yP_z$, P is Cr, x is 0.5, y is 0.04 and z is 0.15; or P is Mn, x is 0.1, y is 0.04 and z is 0.1.

Magnetically soft nickel zinc and manganese zinc ferrites have been extensively used for transformer and inductor applications may be classified as follows: manganese zinc ferrites are used in inductors for resonant circuits operating in the frequency range of 100 kHz to 2 MHz, in ferrite antennas for medium and long wave broadcast bands, and in high permeability applications for wide-band transformers and low power pulse transformers. Manganese and zinc ferrite materials having high saturation flux density and low loss at high flux densities in the frequency range of 10 kHz to 1 MHz have been used for transformers and chokes for switched mode power supplies and in line scanning transformers in television receivers.

Nickel zinc ferrites with permeability values, $\mu$>1000, are used for wide-band transformers operating in the frequency range of 1–300 MHz and pulse transformers for short duration pulses, $t_d$, 0.1 $\mu$s. Nickel zinc ferrites with $\mu$=500–1000 are used for wide band transformers operating in the frequency range of 5–300 MHz, in pulse transformers, ferrite antennas and cores for electromagnetic interference suppression. Nickel zinc ferrites having $\mu$=150–500 are used for antennas for medium and long wave broadcast bands, in power transformers operating in the frequency range of 0.5–5 MHz and in cores for electromagnetic interference suppression. Nickel zinc ferrites having $\mu$=70–150 are used for resonant circuits operating in the frequency range of 2–20 MHz, in ferrite antennas for short wave broadcast bands, in power transformers for the frequency range of 2–30 MHz and in cores for electromagnetic interference suppression. Lower permeability nickel zinc ferrites having $\mu$=35–70 are used for inductors for resonant circuits operating in the frequency range 10–40 MHz and in cores for electromagnetic interference suppression. Nickel zinc ferrites with $\mu$=12–35 are used for inductors for resonant circuits operating in the frequency range of 20–60 MHz and in cores for electromagnetic interference suppression; and nickel zinc ferrites with $\mu$<12 are used for inductors in resonant circuits operating in the frequency range above 30 MHz and in cores for electromagnetic interference suppression.

For commercial M3 ferrite powders having an average particle size of 47–75 $\mu$m (−200 to +325 mesh) the plasma spray process can be accomplished using the following parameters: flow rates of secondary hydrogen gas 2.4 l/min, primary argon gas 23.6 l/min and nitrogen carrier gas 14.2 l/min, powder feed rate 2 kg/hr, plasma power 27 kW and spray distance 7.5 cm under atmospheric conditions.

For commercial H ferrite powder, having a relative permeability of 850 and an average particle size of 47–75 mm (−200 to +325 mesh), the plasma spray process can be accomplished using the following parameters: flow rates of secondary hydrogen gas 8.0 l/min, primary argon gas 23.6 l/min, nitrogen carrier gas 14.2 l/min, powder feed rate 3 kg/hr, plasma power 20 kW, and spray distance of 15.0 cm under atmospheric conditions.

Figure 6:
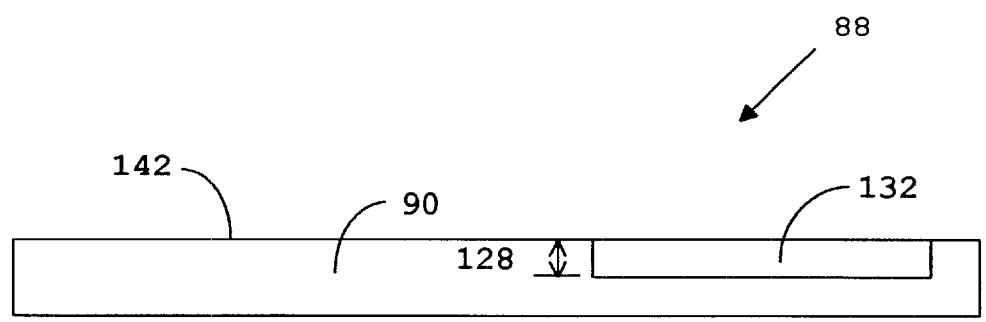
FIG. 6 is a sectional view of the magnetic module of FIG. 5, taken along the lines VI—VI.

A cross sectional view of the plasma sprayed board 130, taken along the lines VI—VI of FIG. 5, is depicted in FIG. 6. As depicted, the exposed surface of the transformer core 132 is planar with the surface 142 of the substrate board 90. Similarly, the exposed surfaces of the filter inductor cores 134, 136, the current sense transformer core 138 and gate drive transformer core 140 are planar with the surface 142 of the substrate board 90.

Figure 7:
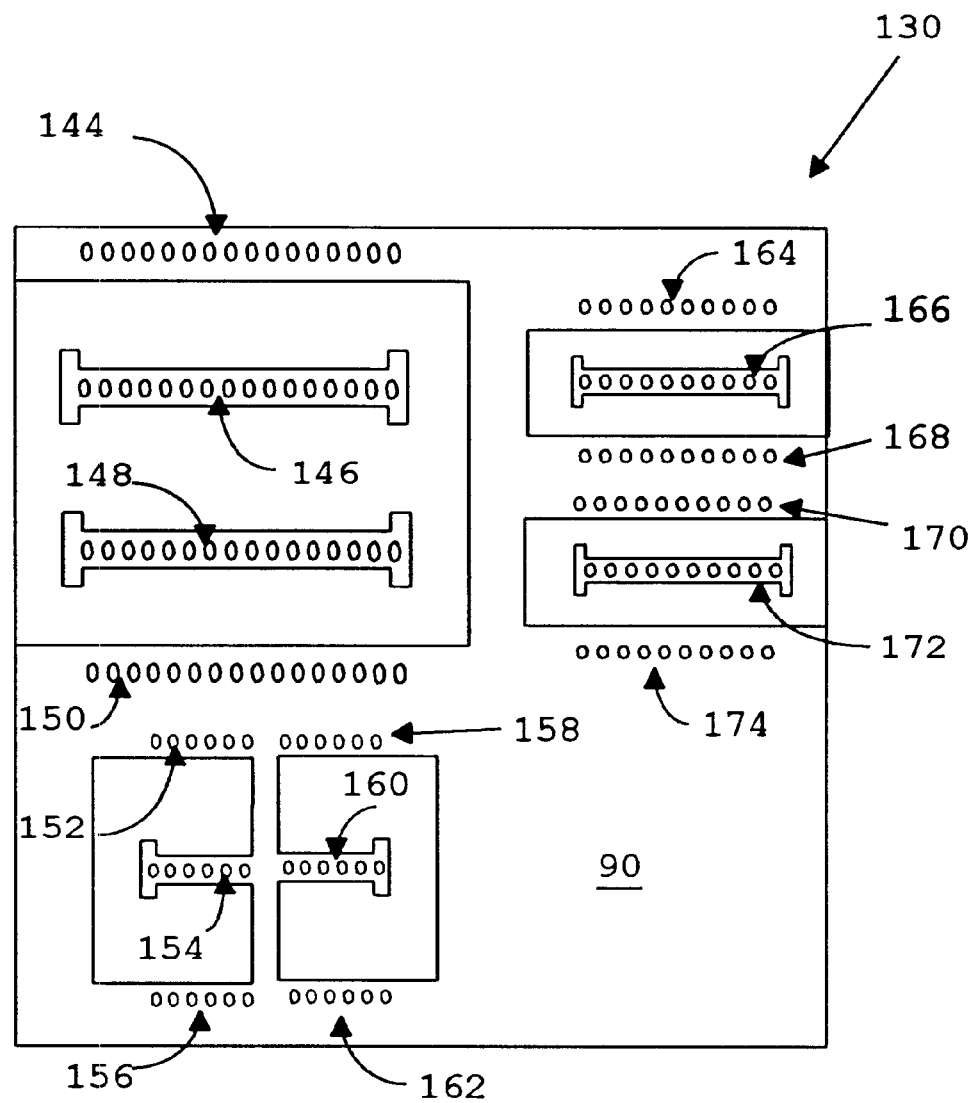
FIG. 7 is a plan view of the magnetic module of FIG. 5, having winding holes, for each of the magnetic cores, formed in the substrate die.

Winding through holes are formed in the substrate board 90 by drilling. The winding holes for the power converter magnetic module are depicted in FIG. 7 and include the power transformer winding holes 144, 146, 148, 150, the filter inductor winding holes 152, 154, 156, 158, 160, 162, the current sense transformer winding holes 164, 166, 168 and the gate drive transformer winding holes 170, 172, 174.

Although described in terms of drilling the winding holes, it should be readily recognized that other methods of forming holes in the substrate board may be readily substituted. Alternative techniques for forming winding holes would include laser ablation, ion milling or the like.

Figure 8:
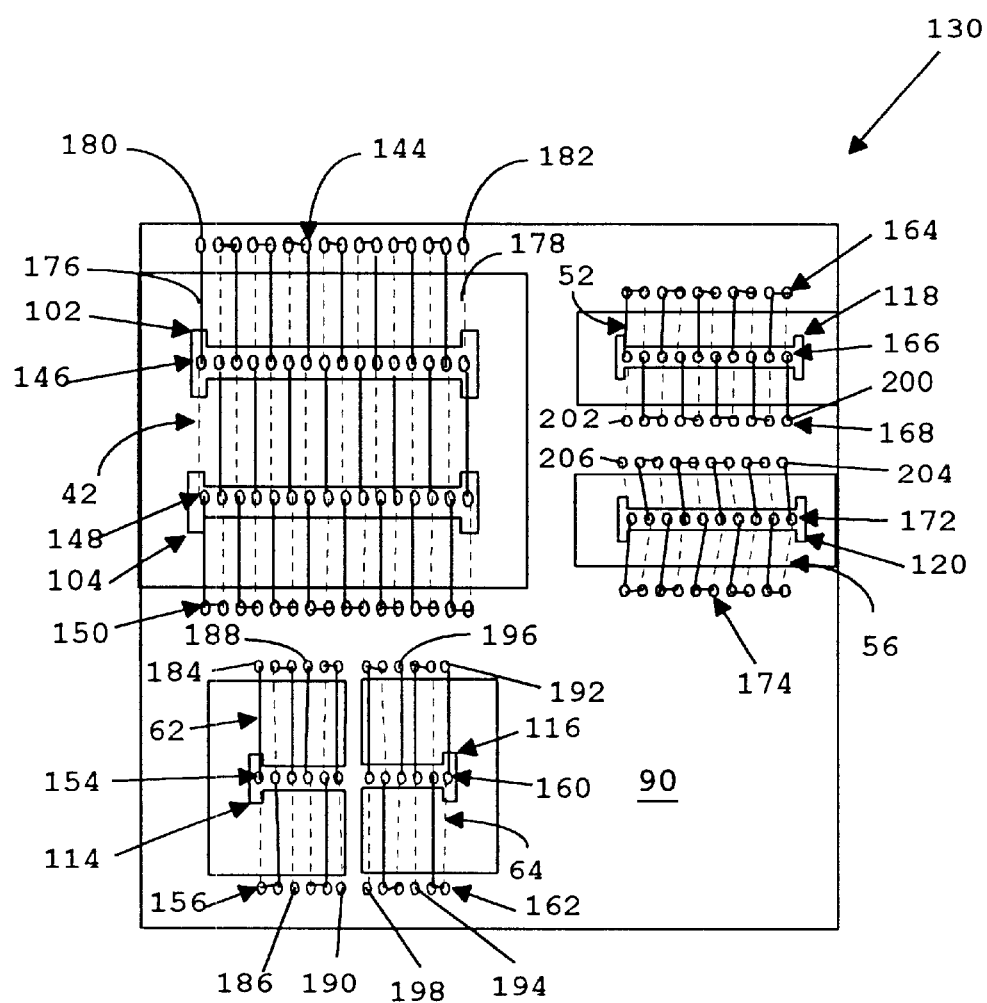
FIG. 8 is a plan view of the magnetic module FIG. 7, with windings applied for the magnetic components depicted.

Subsequent to the formation of the winding holes the magnetic cores are wound using round copper wires, electroplating, electroless plating, chemical vapor polymetric deposition or screen printing techniques. The winding procedure will now be described, first with reference to FIG. 8.

For each of the windings described below, windings plated above the substrate 90 are depicted with a solid line 176 and windings plated beneath the substrate 90 are depicted with a broken line 178.

The primary winding 42 of the power transformer has a positive terminal 180 and a negative terminal 182. Starting at the positive terminal 180 the winding 42 passes, from one of the holes 144 in the substrate 90, above the substrate 90 to the first winding window 102 where it then is fed through one of the holes 146 in the first winding window. The winding passes then from the first winding window to the second winding window 104, below the substrate 90, where it is then fed through one of the holes 148 in the second winding window 104. The winding 42 then passes above the substrate 90 to one of the holes 150 on the opposite side of the power transformer core from the positive terminal.

The winding is fed through an adjacent hole 150 and then fed, below the substrate 90, to the second winding window 104 where it is fed through one of the holes 148 in the second winding window 104. The winding is fed then, above the substrate 90, to the first winding window 102 where it is fed through one of the holes 146 in the first winding window 102. The winding is fed then, below the substrate 90, to one of the holes 144 adjacent the starting hole. The winding 42 continues in this fashion until it reaches the negative terminal 182.

The first filter inductor 38 has a positive terminal 184 and a negative terminal 186. Beginning at the positive terminal 184, the winding 62 passes, from one of the holes 152 in the substrate board 90, above the substrate board 90 to the winding window 114. The winding is fed through one of the holes 154 in the winding window 114 and then passes beneath the substrate 90 to one of the holes 156 in the substrate 90.

The winding then passes through one of the adjacent holes 156 and passes then, above the substrate 90, to the winding window 114 where it passes through one of the holes 154 in the winding window 114. The winding then passes, below the substrate 90, to one of the holes 152. The winding 62 continues in this fashion until it reaches the negative terminal 186. Similarly, the second filter inductor is wound around the first filter inductor core 134 from the positive terminal 188 to the negative terminal 190.

The fourth filter inductor 40 has a positive terminal 192 and a negative terminal 194. Beginning at the positive terminal 192, the winding 64 passes, from one of the holes 158 in the substrate board 90, above the substrate board 90 to the winding window 116. The winding is fed through one of the holes 160 in the winding window 116 and then passes beneath the substrate 102 to one of the holes 162 in the substrate 90.

The winding then passes through one of the adjacent holes 162 and passes then, above the substrate 90, to the winding window 116 where it passes through one of the holes 160 in the winding window 116, the winding then passes, below the substrate 90, to one of the holes 158. The winding 64 continues in this fashion until it reaches the negative terminal 194. Similarly, the third filter inductor is wound around the second filter inductor core 136 from the positive terminal 196 to the negative terminal 198.

The primary winding 52 of the current sense transformer 34 has a positive terminal 200 and a negative terminal 202. Beginning at the positive terminal 200, the winding 52 passes, from one of the holes 168 in the substrate 90, above the substrate 90 to the winding window 118. The winding is fed through one of the holes 166 in the winding window 118 and then passes, beneath the substrate 90, to one of the holes 164 on the opposite side of the core 138.

The winding then passes through an adjacent one of the holes 164 and then passes, above the substrate 90, to the winding window 118. The winding passes through one of the holes 166 in the winding window 118 and then passes, below the substrate 90, to one of the holes 168. The winding continues in this fashion until it reaches the negative terminal 202.

The primary winding 56 of the gate drive transformer 36 has a positive terminal 204 and a negative terminal 206. Beginning at the positive terminal 204, the winding 56 passes, from one of the holes 170 in the substrate board 90, above the substrate 90 to the winding window 120. The winding is fed through one of the holes 172 in the winding window 200 and then passes, beneath the substrate 90, to one of the holes 174 on the opposite side of the core 140.

The winding then passes through an adjacent one of the holes 174 and then passes, above the substrate 90, to the winding window 120. The winding passes through one of the holes 172 in the winding window 120 and then passes, below the substrate 90, to one of the holes 170. The winding continues in this fashion until it reaches the negative terminal 206.

Figure 9:
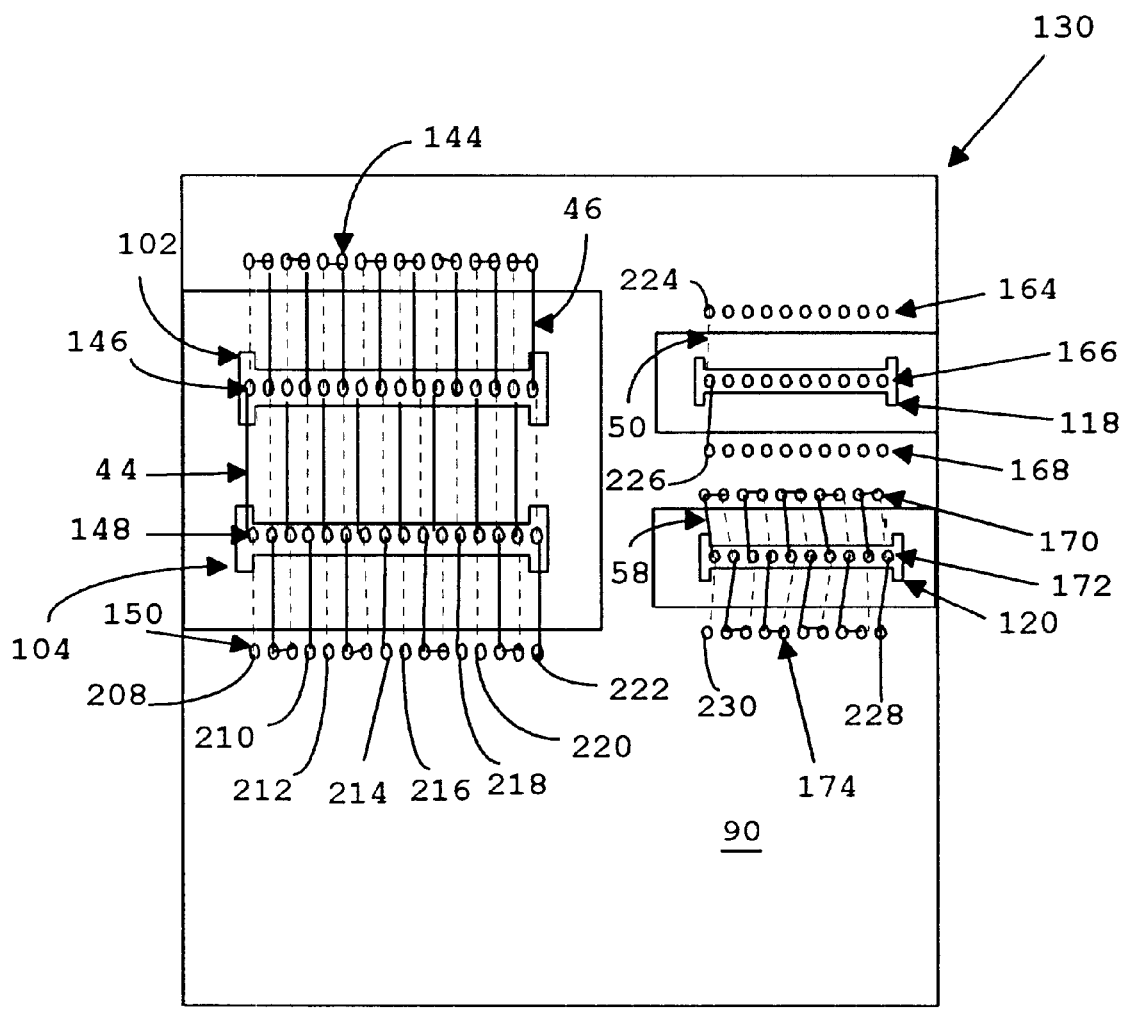
FIG. 9 is a plan view of the magnetic module of FIG. 7, with windings applied for the magnetic components depicted.

The secondary windings of the power transformer 32, the current sense transformer 34 and the gate drive transformer 36 will now be described with reference to FIG. 9.

The power transformer has four secondary windings. The first secondary winding 44 has a positive terminal 208 and a negative terminal 210. Beginning at the positive terminal 208 the winding 44 passes from one of the holes 150 in the substrate 90, beneath the substrate 90, to the second winding window 104 where it then is fed through one of the holes 148 in the second winding window. The winding 44 then passes from the second winding window 104 to the first winding window 102, above the substrate 90 where it is then fed through one of the holes 146 in the first winding window 102. The winding 44 then passes beneath the substrate 90 to one of the holes 144 in the substrate 90.

The winding then passes through one of the adjacent holes 144 and then passes, above the substrate 90, to the first winding window 102 where it passes through one of the holes 146 in the first winding window 102. The winding then passes, below the substrate 90, to the second winding window 104 where it passes through one of the holes 148 in the second winding window 104. The winding then passes, above the substrate 90, to the holes 150. The winding 44 continues in this fashion until it reaches the negative terminal 210.

Similarly, the second secondary winding has positive and negative terminals 212, 214, the third secondary winding has positive and negative terminals 216, 218 and the fourth secondary winding 46 has positive and negative terminals 220, 222. Each of the second, third and fourth secondary windings is wound around the power transformer core 132 in the same fashion described above for the first secondary winding 44.

The secondary winding of the current sense transformer has a positive terminal 224 and a negative terminal 226. Beginning at the positive terminal 224, the winding 50 passes, from one of the holes 164 in the substrate board 90, below the substrate 90 to the winding window 118. The winding is fed through one of the holes 166 in the winding window 118 and then passes, above the substrate 90, to one of the holes 168, on the opposite side of the core 138, which is the negative terminal 226.

The secondary winding 58 of the gate drive transformer has a positive terminal 228 and a negative terminal 230. Beginning at the positive terminal 228, the winding 58 passes, from one of the holes 174 in the substrate 90, above the substrate 90 to the winding window 120. The winding is then fed through one of the holes 172 in the winding window 120 and then passes, beneath the substrate 90, to one of the holes 170 on the opposite side of the core 140.

The winding passes through an adjacent one of the holes 170 and then passes, above the substrate 90, to the winding window 120. The winding passes through one of the holes 172 in the winding window 120 and then passes, below the substrate 90 to one of the holes 174. The winding continues in this fashion until it reaches the negative terminal 230.

Following the winding process the magnetic module may be packaged 29, FIG. 1, for use as a discrete power supply unit. The above described configuration of the magnetic cores and windings results in a substantial reduction in the size of the magnetic components.

The above described process provides a method for manufacturing, reduced volume, low density, planar magnetic components which can be custom designed for integrated circuits. This process results in magnetic modules having increased volumetric and performance efficiency, higher power density and reduced transient characteristics. These modules have particular utility in electronic or power electronic system applications for aeronautical, military, aerospace and electronic warfare.

Commercial applications of these modules include their use in aircraft communication systems, medical diagnostics, consumer electronic products, power electronic systems, personal computer power supplies, automotive electrical systems, hybrid and electrical vehicles, as well as other applications where size, weight and cost are often at a premium.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed as new and desired to be protected by Letters Patent of the U.S. is:

1. A magnetic module comprising a magnetic core deposited into a cavity patterned into a non-magnetic substrate board.

2. The magnetic module of claim 1 wherein a plurality of magnetic cores are deposited into cavities patterned in said substrate board.

3. The magnetic module of claim 2 wherein said magnetic cores form an outer surface planar with said substrate board.

4. The magnetic module of claim 2 wherein said magnetic cores are plasma sprayed into said cavities etched in said substrate board.

5. The magnetic module of claim 4 wherein said substrate board is non-magnetic ceramic.

6. The magnetic module of claim 4 wherein said substrate board is a composite of graphite.

7. The magnetic module of claim 4 wherein said substrate board is a composite of alumina.

8. The magnetic module of claim 4 wherein said cavities are patterned using laser ablation.

9. The magnetic module of claim 8 wherein said magnetic cores form an outer surface planar with said substrate board.

10. A method for manufacturing a magnetic module comprising the steps of patterning a cavity into a substrate non-magnetic and depositing a magnetic material into said cavity patterned in said non-magnetic substrate.

11. The method of claim 10 wherein a plurality of cavities are patterned into said substrate and wherein magnetic material is deposited into said plurality of cavities.

12. The method of claim 11 wherein said depositing step is performed using plasma spraying.

13. The method of claim 11 wherein said depositing step is performed using spin-on pyrolysis.

14. The method of claim 12 wherein said magnetic material is a substituted nickel zinc cobalt ferrite.

15. The method of claim 12 wherein said magnetic material is a substituted manganese zinc cobalt ferrite.

16. The method of claim 12 wherein said magnetic material has varying permeabilities.

17. The method of claim 12 wherein the patterning step is performed using ion milling.

18. The method of claim 12 wherein said patterning step is performed using mechanical machining.

19. The method of claim 12 wherein said patterning step is performed using laser ablation.

20. The method of claim 19 wherein said substrate is a non-magnetic ceramic.

21. The method of claim 19 wherein said substrate is a composite of graphite.

22. The method of claim 19 wherein said substrate is a composite of alumina.

23. The method of claim 19 further comprising the step of forming winding holes in said substrate.

24. The method of claim 23 further comprising the step of applying electrical windings around said magnetic cores.

* * * * *